(12) United States Patent
Suzuki

(10) Patent No.: US 9,285,585 B2
(45) Date of Patent: Mar. 15, 2016

(54) ANTIFOULING COATING FOR EYEGLASS LENSES WITH A HIGHER COEFFICIENT OF FRICTION THAN UNCOATED LENSES

(71) Applicant: HOYA LENS MANUFACTURING PHILIPPINES INC., Cavite (PH)

(72) Inventor: Keiichi Suzuki, Kamiina-gun (JP)

(73) Assignee: EHS LENS PHILIPPINES, INC., Cavite (PH)

( * ) Notice: Subject to any disclaimer, the term of this patent is extended or adjusted under 35 U.S.C. 154(b) by 0 days.

(21) Appl. No.: 14/167,329

(22) Filed: Jan. 29, 2014

(65) Prior Publication Data

US 2014/0211150 A1    Jul. 31, 2014

(30) Foreign Application Priority Data

Jan. 30, 2013 (JP) ................................. 2013-015204

(51) Int. Cl.
| | |
|---|---|
| *G02B 27/00* | (2006.01) |
| *G02B 1/10* | (2015.01) |
| *G02B 1/18* | (2015.01) |

(52) U.S. Cl.
CPC .............. *G02B 27/0006* (2013.01); *G02B 1/10* (2013.01); *G02B 1/105* (2013.01); *G02B 1/18* (2015.01)

(58) Field of Classification Search
CPC ...... G02B 27/0006; G02B 1/105; B24B 9/14; B24B 13/005
USPC ..................................................... 351/159.57
See application file for complete search history.

(56) References Cited

U.S. PATENT DOCUMENTS

| | | | |
|---|---|---|---|
| 2005/0168685 A1* | 8/2005 | Katagiri et al. ............... | 351/159 |
| 2006/0244910 A1* | 11/2006 | Nam .............................. | 351/166 |
| 2010/0028682 A1* | 2/2010 | Shinohara ..................... | 428/409 |
| 2010/0093951 A1* | 4/2010 | Oikawa et al. ................ | 525/474 |
| 2012/0272800 A1 | 11/2012 | Lacan et al. | |

FOREIGN PATENT DOCUMENTS

| | | |
|---|---|---|
| JP | 9-263728 A | 10/1997 |
| JP | 2004-145283 A | 5/2004 |
| JP | 2005-505427 A | 2/2005 |
| JP | 2007-152553 A | 6/2007 |

OTHER PUBLICATIONS

Extended European Search Report issued in the corresponding European Patent Application No. 14153192.1 dated Apr. 11, 2014.

* cited by examiner

*Primary Examiner* — Jordan Schwartz
*Assistant Examiner* — George G King
(74) *Attorney, Agent, or Firm* — Sughrue Mion, PLLC

(57) ABSTRACT

The optical article includes an optical substrate comprising a concave surface with a radius of curvature of equal to or greater than 350 mm on one side and a convex surface with a radius of curvature of equal to or greater than 120 mm on the other side, a first antifouling layer directly or through at least one additional layer on the concave surface, and a second antifouling layer directly or through at least one additional layer on the convex surface, and satisfies the conditions below:

$0.01 \leq \mu L1 \leq 0.12$ $0.1 \leq \mu L2$ $\mu L1 < \mu L2$ wherein μL1 denotes a coefficient of static friction of a surface of the first antifouling layer, and μL2 denotes a coefficient of static friction of a surface of the second antifouling layer.

12 Claims, 5 Drawing Sheets

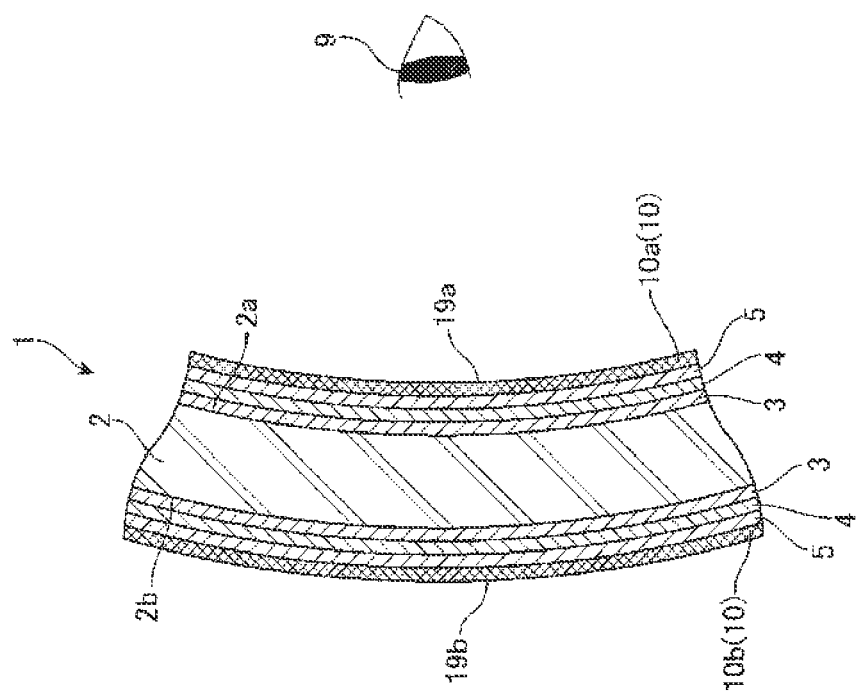

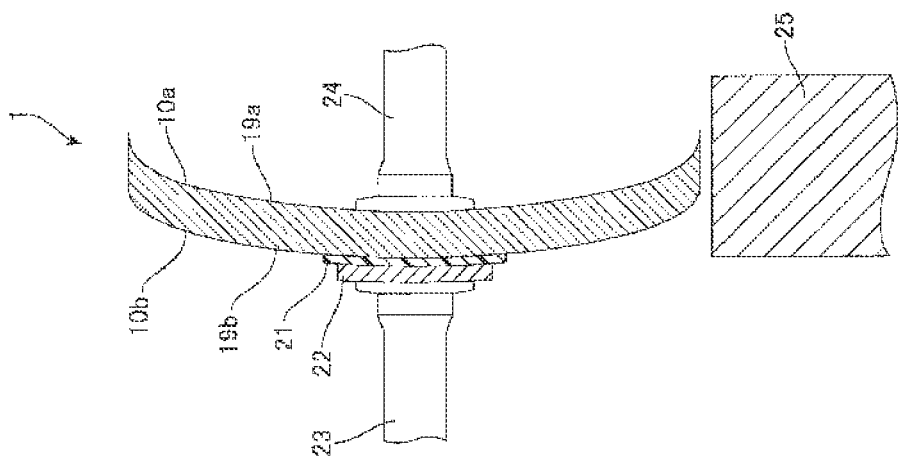

Fig. 3

| | Concave surface | | Convex surface | | Axial displacement incidence in edging process [%] | Average value of axial displacement angle [°] | Overall evaluation |
|---|---|---|---|---|---|---|---|
| | Antifouling condition (coefficient of static friction) | Wiping property of grime | Antifouling condition (coefficient of static friction) | Wiping property of grime | | | |
| Ex.1 | A-1 (0.054) | ◎ | C (0.125) | ○ | 0 | 0.0 | ○ |
| Ex.2 | B-1 (0.078) | ◎ | C (0.125) | ○ | 0 | 0.0 | ○ |
| Ex.3 | A-1 (0.054) | ◎ | E (0.131) | ○ | 0 | 0.0 | ○ |
| Ex.4 | B-1 (0.078) | ◎ | E (0.131) | ○ | 0 | 0.0 | ○ |
| Ex.5 | B-1 (0.078) | ◎ | B-4 (0.107) | ○ | 0 | 0.4 | ○ |
| Ex.6 | B-3 (0.095) | ◎ | C (0.125) | ○ | 0 | 0.0 | ○ |
| Comp.Ex.1 | A-1 (0.054) | ◎ | A-2 (0.065) | ◎ | 70 | 1.6 | × |
| Comp.Ex.2 | B-1 (0.078) | ◎ | B-2 (0.081) | ◎ | 80 | 1.6 | × |
| Comp.Ex.3 | B-1 (0.078) | ◎ | D (0.378) | × | 0 | 0.0 | × |
| Comp.Ex.4 | C (0.120) | ○ | A-1 (0.054) | ◎ | 80 | 1.7 | × |
| Comp.Ex.5 | B-1 (0.078) | ◎ | B-3 (0.083) | ◎ | 20 | 0.7 | × |
| Comp.Ex.6 | D (0.379) | × | C (0.120) | ○ | 0 | 0.0 | × |

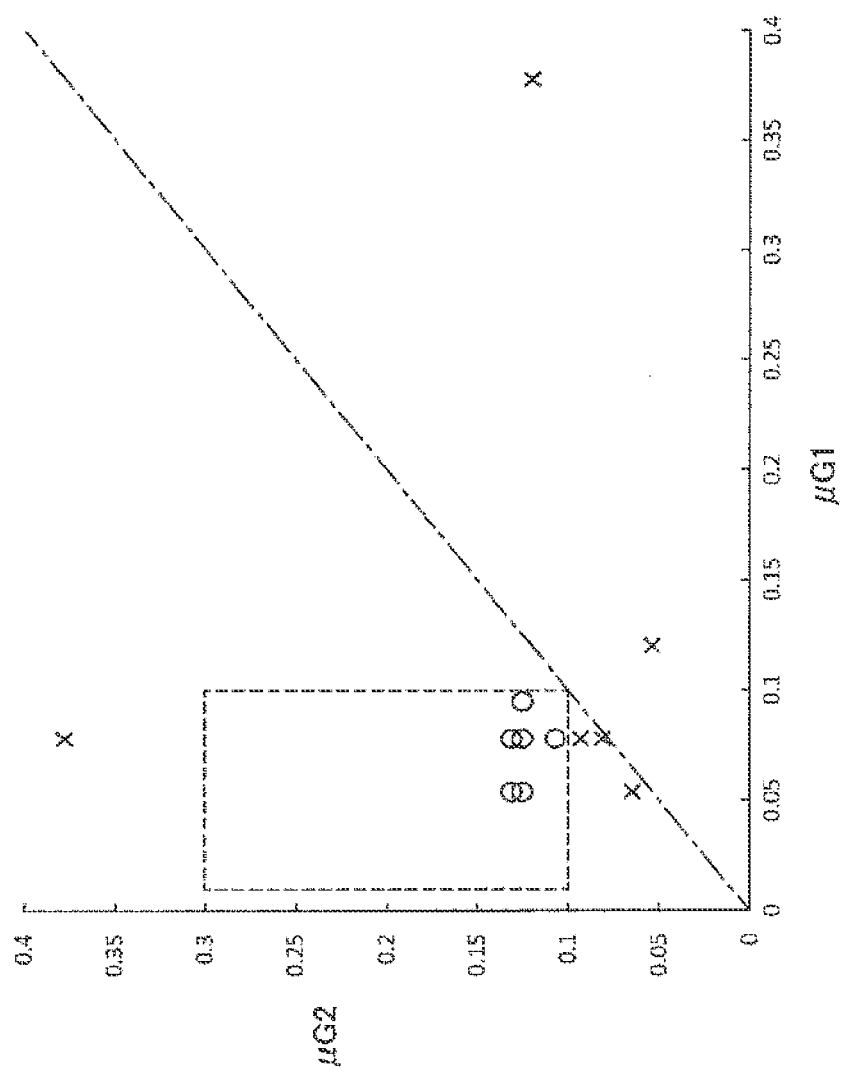

Fig. 5

| Sample | Surface | Radius of curvature [mm] | Coefficient of static friction | Rate of increase relative to the value on the glass sample |
|---|---|---|---|---|
| Lens (S +4.00) | Concave | 441.33 | 0.133 | 20.9% |
|  | Convex | 122.1 | 0.103 | -6.4% |
| Lens (S +2.25) | Concave | 441.33 | 0.129 | 17.3% |
|  | Convex | 177.7 | 0.106 | -3.6% |
| Glass | - | - | 0.110 | - |

US 9,285,585 B2

ANTIFOULING COATING FOR EYEGLASS LENSES WITH A HIGHER COEFFICIENT OF FRICTION THAN UNCOATED LENSES

CROSS-REFERENCE TO RELATED APPLICATIONS

This application claims the benefit of priority under 35 USC 119 to Japanese Patent Application No. 2013-015204 filed on Jan. 30, 2013, which is expressly incorporated herein by reference in its entirety.

BACKGROUND OF THE INVENTION

1. Field of the Invention

The present invention relates to an optical article and a method of manufacturing the same.

2. Discussion of the Background

Published Japanese translation of PCT international publication for patent application (TOKUHYO) No. 2005-505427, which is expressly incorporated herein by reference in its entirety, describes a technology relating to a method of manufacturing an optical glass for edge polishing having a water repellant and/or an oil-repellant coating. Published Japanese translation of PCT international publication for patent application (TOKUHYO) No. 2005-505427, characterized in that a temporary protective layer imparting a surface energy of at least 15 mJ/m$^2$ to glass is applied to a glass surface, comprises a step of removing the temporary protective layer to restore the water-repellant and/or oil-repellant surface characteristics of the glass.

In optical articles such as eyeglasses and sunglasses, a water-repellant and/or oil-repellant antifouling layer may be laminated, either directly or through a hard coat layer, anti-reflective layer, or the like, on the surface of an optical substrate comprised chiefly of glass or plastic. Many of the components that make up the antifouling layer (the structure of antifouling layer and antifouling conditions) contain fluoride silane materials to prevent viscous oily grime and facilitate removal. One problem with such surface coatings is that the stronger the water-repellant and/or oil-repellant property, the stronger the effect (the greater the tendency to slip) of changing the adhesive strength at the interface on convex surfaces sometimes becomes. In Published Japanese translation of PCT international publication for patent application (TOKUHYO) No. 2005-505427, the temporary protective layer is applied to the glass having a water-repellant and/or oil-repellant surface coating to obtain adequate adhesive strength at the holding pad/glass interface. Subsequently, the temporary protective layer is removed to restore the water-repellant and/or oil-repellant surface characteristics of the glass. However, the operations of forming the temporary protective layer and then removing it complicate the operation of manufacturing an optical article.

SUMMARY OF THE INVENTION

An aspect of the present invention provides for an optical article with good antifouling performance that can enhance the efficiency of processing operations by suitable holding in the course of processing even without additional operations such as providing a temporary protective layer.

An aspect of the present invention relates to an optical article, which comprises:

an optical substrate comprising a concave surface on one side and a convex surface on the other side;

a first antifouling layer directly or through at least one additional layer on the concave surface; and a second antifouling layer directly or through at least one additional layer on the convex surface;

and satisfies the conditions below:

$$\mu G1 < \mu G2 \tag{0}$$

$$0.01 \le \mu G1 \le 0.1 \tag{1}$$

$$0.1 \le \mu G2 \tag{2}$$

wherein $\mu G1$ denotes a coefficient of static friction of a surface of the first antifouling layer when formed directly or through at least one additional layer on a flat glass substrate, and $\mu G2$ denotes a coefficient of static friction of a surface of the second antifouling layer when formed directly or through at least one additional layer on a flat glass substrate.

By having the coefficient of static friction $\mu G1$ of the first antifouling layer satisfy condition (1), the concave surface can exhibit good grime wiping property (antifouling performance). In operations such as edge polishing, the convex surface is often primarily held and the concave surface is often supplementarily held. By having the coefficient of static friction $\mu G1$ of the first antifouling layer and the coefficient of static friction $\mu G2$ of the second antifouling layer satisfy condition (0) as well as having the coefficient of static friction $\mu G2$ of the second antifouling layer satisfy condition (2), processing can be conducted by suitably holding the optical article without providing a temporary protective layer or the like while retaining a concave surface of good wiping property. Accordingly, it is possible to provide an optical article with good antifouling performance and good operating efficiency because it is possible to omit the formation and removal of a temporary protective layer.

A further aspect of the present invention relates to an optical article, which comprises:

an optical substrate comprising a concave surface with a radius of curvature of equal to or greater than 350 mm on one side and a convex surface with a radius of curvature of equal to or greater than 120 mm on the other side;

a first antifouling layer directly or through at least one additional layer on the concave surface; and a second antifouling layer directly or through at least one additional layer on the convex surface;

and satisfies the conditions below:

$$0.01 \le \mu L1 \le 0.12 \tag{3}$$

$$0.1 \le \mu L2 \tag{4}$$

$$\mu L1 < \mu L2 \tag{5}$$

wherein $\mu L1$ denotes a coefficient of static friction of a surface of the first antifouling layer, and $\mu L2$ denotes a coefficient of static friction of a surface of the second antifouling layer.

By having the coefficient of static friction $\mu L1$ of the first antifouling layer in a concave surface with a radius of curvature of equal to or greater than 350 mm satisfy condition (3), the concave surface can exhibit extremely good grime wiping property (antifouling performance). Further, in operations such as edge polishing, the convex surface is often primarily held and the concave surface is often supplementarily held. By having the coefficient of static friction $\mu L1$ of the first antifouling layer and the coefficient of static friction $\mu L2$ of the second antifouling layer satisfy condition (5) and having the coefficient of static friction of the second antifouling layer satisfy condition (4) in a convex surface with a radius of curvature of equal to or greater than 120 mm, it becomes possible to conduct processing by suitably holding the optical article without providing a temporary protective layer or the like even when the grime wiping property of the concave surface is good. Accordingly, it is possible to provide an optical article affording good antifouling performance and good operating efficiency because the steps of forming and removing the temporary protective layer can be omitted.

In an embodiment, the above optical article is an eyeglass lens such as an ophthalmic lens or a sunglass lens. The optical substrate has a concave surface and a matching opposite convex surface. In a typical optical substrate (eyeglass lens substrate) included in an eyeglass lens, the concave surface is on the eyeball side. When the wearer wears an optical article as an eyeglass, since extremely good antifouling performance can be imparted to the surface on the eyeball side, which is often fouled with sebum, sweat, and the like, fouling of the optical article is effectively suppressed. Additionally, on the surface on the object side, performance permitting holding of the optical article during processing can be imparted in addition to imparting good antifouling performance.

In an embodiment, either or both of the first and second antifouling layers is an outermost layer of the optical article, such as an eyeglass lens.

In an embodiment, the first and second antifouling layers comprise an antifouling agent in the form of an organic compound.

In an embodiment, the above organic compound is a fluorine-containing organic compound.

A further aspect of the present invention relates to a method of manufacturing an optical article, which comprises conducting an edging process of the above optical article in a state where an outermost surface on the concave surface side and an outermost surface on the convex surface side of the optical article are brought into contact with a holder and held by the holder.

In an embodiment, the outermost surface on the concave surface side and an outermost surface on the convex surface side are the surface of the first antifouling layer and the surface of the second antifouling layer.

Other exemplary embodiments and advantages of the present invention may be ascertained by reviewing the present disclosure and the accompanying drawing.

BRIEF DESCRIPTION OF THE DRAWINGS

The present invention will be described in the following text by the exemplary, non-limiting embodiments shown in the figure, wherein:

FIG. 1 is a drawing showing the typical structure of an eyeglass lens.

FIG. 2 is a schematic diagram showing an edging process.

FIG. 3 is a table showing evaluation results.

FIG. 4 is a graph showing a distribution of overall evaluation of coefficients of static friction.

FIG. 5 is a table showing results of measurement of coefficients of static friction of an eyeglass lens.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

FIG. 1 shows a typical structure of an eyeglass lens comprising a plastic lens substrate as an example of an optical article. Eyeglass lens 1 comprises a lens substrate 2, a primer layer 3 formed on both surfaces (concave surface 2a and convex surface 2b) of the lens substrate, a hard coat layer 4 formed on the surface of primer layer 3, an antireflective layer 5 formed on the surface of hard coat layer 4, and an antifouling layer 10 formed on the surface of antireflective layer 5. Eyeglass lens 1 is a meniscus lens of positive or negative refractive power of the protrusion on the object side (indentation on the eyeball 9 side) depending on how it is worn in front of the eyeball 9 by the wearer. Accordingly, concave surface 2a and convex surface 2b are disposed such that concave surface 2a is positioned on the eyeball 9 side of the wearer and convex surface 2b is positioned on the side of the object that is being viewed by the wearer. Since antifouling layer 10 is the outermost layer of eyeglass lens 1 (the layer farthest away from lens substrate 2), the outer layer 19a of the antifouling layer 10 (first antifouling layer 10a) formed on the concave surface 2a side is the surface on the eyeball side of eyeglass lens 1, and the surface 19b of antifouling layer 10 (second antifouling layer 10b) that is formed on the convex surface 2b side is the object surface of eyeglass lens 1.

Lens substrate 2 of lens 1 in the present example is plastic, but it could also be glass. The refractive index of lens substrate 2 is not specifically limited. Examples of lens materials made of plastic are diethylene glycol bisallyl carbonate (CR-39), polycarbonate, or a polythiourethane plastic produced by reacting a compound having an isocyanate group or an isothiocyanate group with a compound having a mercapto group.

Primer layer 3 is formed on the surface of lens substrate 2 and can enhance the overall durability of the surface treatment film and increase adhesion with hard coat layer 4. Primer layer 3 can be omitted, and is sometimes not provided with glass lenses. Primer layer 3 is typically a layer formed with a coating composition containing a polar organic resin polymer and metal oxide microparticles comprising titanium oxide. The organic resin polymer employed can be various resins such as polyester resins, polyurethane resins, epoxy resins, melamine resins, polyolefin resins, urethane acrylate resins, and epoxy acrylate resins.

Hard coat layer 4 can function to enhance the surface strength of lens 1. It is sometimes not provided with glass lenses. A typical example of hard coat layer 4 is a layer formed with a coating composition comprising metal oxide microparticles containing titanium oxide and the organic silicon compound denoted by formula (11) below.

$$R^1R^2_nSiX^1_{3-n} \quad (11)$$

(In the formula, $R^1$ denotes an organic group having a polymerizable reactive group, $R^2$ denotes a hydrocarbon group having 1 to 6 carbon atoms, $X^1$ denotes a hydrolyzable group, and n denotes 0 or 1.)

The titanium oxide can be of either the anatase or rutile form. From the perspectives of weatherability and light resistance, the presence of a rutile crystalline structure is desirable. Examples of organic silicon compounds are vinyl trialkoxysilane, binyltrichlorosilane, vinyltri(β-methoxyethoxy)silane, allyltrialkoxysilane, acryloxypropyltrialkoxysilane, methacryloxypropyltrialkoxysilane, γ-glycidoxypropyltrialkoxysilane, β-(3,4-epoxycyclohexyl)-ethyltrialkoxysilane, mercaptopropyltrialkoxysilane, and γ-aminopropyltrialkoxysilane.

Antireflective layer 5 is comprised of a layer having a refractive index that is lower by equal to or more than 0.10 than the refractive index of the hard coat layer, and is in the form of an organic or inorganic layer having a thickness of equal to or more than 50 nm and equal to or less than 500 nm. The layer can be a single layer or multiple layers. Examples of materials of thin layers that can constitute an inorganic antireflective film in addition to $SiO_2$ are SiO, $ZrO_2$, $TiO_2$, TiO, $Ti_2O_3$, $Ti_2O_5$, $Al_2O_3$, $Ta_2O_5$, $CeO_2$, MgO, $Y_2O_3$, $SnO_2$, $MgF_2$, and $WO_3$.

An example of an organic antireflective layer is one formed with a composition comprising the organic silicon compound denoted by general formula (12) below and silica microparticles:

$$R^3_iR^4_jSiX^2_{4-i-j} \quad (12)$$

(In the formula, $R^3$ denotes an organic group having a polymerizable reactive group. $R^4$ denotes a hydrocarbon group having 1 to 6 carbon atoms. $X^2$ denotes a hydrolyzable group. At least one from among i or j denotes 1, and the other denotes 0 or 1.)

Antifouling layer 10 is a layer the primary goal of which is to prevent water droplets and/or grime from adhering to the two surfaces 2a and 2b of lens 1. That is, when antireflective layers 5 are provided on two surfaces 2a and 2b of lens 1, antifouling layers 10 are formed over antireflective layers 5 on two surfaces 2a and 2b to prevent water droplets and/or grime from adhering. One typical coating agent for forming antifouling layer 10 is a coating agent (first type of coating agent) containing a fluorine organic silicon compound with a molecular weight of about 500, primarily with the objective of preventing the adhesion of water droplets. The first type of coating agent is molecularly designed to repel water. The emphasis is not on making it possible to wipe away grime. In this context, in the present invention, the molecular weight for a polymer can be an average molecular weight, and the average molecular weight is a number average molecular weight measured by a gel permeation chromatography (GPC) with a polystyrene conversion.

Another type of typical coating agent forming antifouling layer 10 is a coating agent (second type of coating agent) that is treated, for example, to incorporate ether bonds into a fluorine-containing organic silicon compound to increase the molecular weight to about 2,000 to 10,000. An antifouling layer 10 that is formed with the second type of coating agent is characterized in that the molecules constituting the layer are flexible. In addition to a water-repelling function, it is possible to form an antifouling layer 10 with a high degree of grime wiping property. Known coating agents of the second type include those hydrolyzable condensates of perfluoropolyalkylene ether-modified silanes described in Japanese Unexamined Patent Publication (KOKAI) No. 2004-145283, which is expressly incorporated herein by reference in its entirety, and the mixtures of silicon-containing organic fluorine polymers described in Japanese Unexamined Patent Publication (KOKAI) Heisei No. 09-263728, which is expressly incorporated herein by reference in its entirety.

The coefficient of friction of an antifouling layer 10 formed using a coating agent of the second type is low. Thus, axial displacement (displacement of lens 1 from the holding position at the start of processing or in the direction of holding) tends to occur during edging process (edge polishing, trimming). Accordingly, methods of preventing axial displacement have been proposed. For example, Published Japanese translation of PCT international publication for patent application (TOKUHYO) No. 2005-505427 describes forming a temporary protective layer. Japanese Unexamined Patent Publication (KOKAI) No. 2007-152553, which is expressly incorporated herein by reference in its entirety, describes the use of axial displacement-preventing tape.

In recent years, coating agents of high antifouling function (the third type of coating agent) have also been developed. The use of a coating agent of the third type can yield a coating of even better grime wiping property. Accordingly, investigation into using coating agents of the third type to form antifouling layers 10 on eyeglass lenses 1 has been conducted. Since the sliding property of the two surfaces 2a and 2b of lens 1 can be enhanced, it can be anticipated that the grime wiping property can be enhanced more than in an antifouling layer 10 in which a coating agent of the second type is employed.

On the other hand, when antifouling layers 10 employing a coating agent of the third type are formed on both surfaces 2a and 2b of a lens 1, in the method of applying axial displacement-preventing tape, the adhesive strength of the tape is inadequate, the lens may not be adequately secured, and the possibility exists of lens displacement during edging process. The method of forming a temporary protective layer to achieve adequate adhesive strength at the holding pad/glass interface and then subsequently removing the temporary protective layer as is described in Published Japanese translation of PCT international publication for patent application (TOKUHYO) No. 2005-505427 is undesirable because it complicates the operation of manufacturing an optical article.

Thus, the present inventor conducted extensive research. As a result, they discovered that it was possible to prevent axial displacement when the coefficient of static friction of the surface 19b of antifouling layer 10 formed on convex surface 2b was greater than the coefficient of static friction of the surface 19a of antifouling layer 10 formed on the concave surface 2a. The present inventor formed antifouling layers 10 on concave surface 2a and convex surface 2b in a variety of systems (systems, antifouling conditions) of varying coating agent and film thickness to manufacture lens samples of differing surface physical properties of concave surface 2a and surface physical properties of convex surface 2b, and were able to provide lenses 1 with good antifouling performance and permitting precise edging process with little axial displacement. As a result of research conducted by the present inventor, it became clear that the axial displacement could be effectively prevented by keeping the coefficient of static friction of antifouling layer 10 to within a prescribed range. Such lens 1 can be processed by conventional edge processing methods. That is, even without providing a temporary protective layer on lens 1, by polishing the edge of lens 1, it is possible to obtain a lens 1 that had been processed into a shape that can be inserted into an eyeglass frame, for example, without the direction of the cylinder axis being displaced relative to the prescription. The processed lens 1 can be inserted into an eyeglass frame by the same operation as a conventional eyeglass lens without having to remove a protective layer or the like. Confirmation testing will be described below. The quantities of vapor deposited material and the degrees of opening of the correction plate indicated below were to vary the film thickness.

1. Manufacturing Lens Samples

Lens sample (lens) 1 was manufactured as follows. A lens substrate in the form of an eyeglass-use plastic lens (made by Seiko Optical articles Co., Ltd.: SEIKO SUPER SOVEREIGN) was employed. Hard coat layers 4 of identical conditions (composition and film formation conditions) were formed on concave layer 2a and convex layer 2b of lens substrate 2. In the present example, the primer layer was omitted. A coating composition containing metal oxide microparticles and an organic silicon compound was employed to form hard coat layer 4.

An antireflective layer 5 was also formed on the surface of hard coat layer 4. Antireflective layers 5 of identical conditions were formed on the concave surface 2a side and convex surface 2b side of the lens substrate. In the present example, prescribed thicknesses of $SiO_2$ and $ZrO_2$ were alternately laminated to form an inorganic antireflective layer 5 in which the outermost layer was a $SiO_2$ layer. A vapor deposition device equipped with multiple vacuum chambers, a vacuum generating device, multiple vapor deposition sources, an electron gun causing the vapor deposition source to vaporize, an opening and closing shutter for adjusting the level of vapor deposition, and the like was employed to form antireflective layer 5.

An antifouling layer 10 was formed on the surface of antireflective layer 5. A first antifouling layer 10a and a second antifouling layer 10b of differing conditions (first antifouling condition and second antifouling condition) were formed with a vapor deposition device on the concave surface 2a side and on the convex surface 2b side of lens substrate 2. In the present example, a vapor deposition device having a vacuum chamber connected to the vacuum deposition device forming antireflective layer 5 was employed. A vapor deposition source impregnated with an organic compound, a heater (typically a halogen lamp), and a correction plate were disposed within the chamber. The correction plate was of the fixed type. By adjusting the opening, it was possible to adjust the amount of vapor released toward the support device on which multiple lenses 1 were supported. Within the chamber, a suitable pressure was maintained by means of a vacuum generating device equipped with a rotary pump, root pump, or turbo molecular pump.

2. Antifouling Conditions

The following antifouling conditions A-1 to E were employed as the conditions of the first antifouling layer 10a and the second antifouling layer 10b. Layers (sample antifouling layers) were formed with the various antifouling conditions on glass samples each consisting of a sheet-like glass substrate on which had been formed an antireflective layer 5 of the same conditions as in lens sample 1, and the coefficient of static friction of the surface (coefficient of static friction μG of the surface of the sample antifouling layer on the glass sample) was measured. In the measurement, a portable tribometer (HEIDON Tribogear Muse type 94iII, made by Shinto Scientific Co. Ltd.) was employed. Cotton cloth (Tenziku-triple width sheeting) was mounted on the slider and the coefficient of static friction was measured. The measurement was conducted on samples, which had been left standing for equal to or more than three days following vapor deposition, in a measurement environment of 23° C. and around 50% relative humidity (RH) and the average of three measurement values was calculated. The surface to be measured was not wiped with a fluorine solvent. When the surface had been fouled, the surface was wiped with a non-fluorine solvent such as acetone or ethanol.

When the trend in the coefficient of static friction was determined following the deposition of antifouling layer 10, a somewhat low value was exhibited following vapor deposition. As the reaction between antifouling layer 10 and the substrate progressed, the coefficient of static friction gradually increased. The coefficient of static friction became nearly constant after about 1 or 2 days, and the reaction was considered to have concluded. Thus, as stated above, measurement of the coefficient of static friction of antifouling layer 10 was conducted after standing for three days following vapor deposition so that the reaction had stabilized. Further, if a fluorine solvent had been employed to remove grime and the like, there would have been the possibility of removing components of antifouling layer 10 that contributed to antifouling performance. Thus, fluorine solvents were not used to remove grime or the like.

2.1 Antifouling Condition A-1

SURFCLEAR100 (antifouling agent A) made by Canon Optron Ltd. was employed as the organic compound (antifouling agent) used to form antifouling layer 10. Antifouling agent A was impregnated to 40 mg solid component in a copper vessel (18 mm in diameter, 7 mm in height) filled with #0000 steel wool. This was then set within the chamber as the vapor deposition source. Employing a halogen lamp as a heater, the vapor deposition source pellets were heated to 600° C., causing antifouling agent A to vaporize and form an antifouling layer. The vapor deposition period was five minutes. Once vapor deposition had ended, the interior of the chamber was gradually returned to atmospheric pressure. The glass sample was removed, placed in a constant-temperature, constant-humidity chamber at 60° C. and RH 60%, and kept there for two hours to conduct annealing. The coefficient of static friction μG of antifouling condition A-1 on the glass sample was 0.054.

2.2 Antifouling Condition A-2

In the same manner as described above, SURFCLEAR100 (antifouling agent A) made by Canon Optron Ltd. was employed as the antifouling agent and antifouling layer 10 was formed. However, the opening of the correction plate was adjusted to make it somewhat smaller. Annealing was conducted in the same manner. The coefficient of static friction μG of antifouling condition A-2 on the glass sample was 0.065. In some instances below, "antifouling condition A" will be used to collectively refer to antifouling conditions A-1 and A-2.

2.3 Antifouling Condition B-1

KY-178 (antifouling agent B) made by Shin-Etsu Chemical Co., Ltd. was employed as the antifouling agent. Antifouling agent B was diluted in fluorine solvent (Novec 7200 made by Sumitomo 3M Limited) to prepare a solid component concentration 3% solution. This was used to impregnate a copper vessel (18 mm in diameter, 7 mm in height) filled with #0000 steel wool, the solvent was evaporated off by heating for 20 minutes at 80° C., and 30 mg of the solid component was placed in the chamber as a vapor deposition source. During film formation, the pellets of vapor deposition source were heated with a halogen lamp heater to 600° C., causing antifouling agent B to vaporize and form antifouling layer 10. The vapor deposition period was 5 minutes. Once vapor deposition had ended, the interior of the chamber was gradually returned to atmospheric pressure. The glass sample was removed, placed in a constant-temperature, constant-humidity chamber set to 60° C. and RH 60%, and kept there for two hours to conduct annealing. The coefficient of static friction μG of antifouling condition B-1 on the glass sample was 0.078.

2.4 Antifouling Condition B-2

In the same manner as described above, KY-178 (antifouling agent B) made by Shin-Etsu Chemical Co., Ltd. was employed as the antifouling agent and an antifouling layer 10 was formed. However, the opening of the correction plate was adjusted to make it somewhat smaller. When the vapor deposition had ended, the interior of the chamber was gradually returned to atmospheric pressure. The glass sample was removed, placed in a constant-temperature, constant-humidity chamber set to 60° C. and RH 60%, and kept there for two hours to conduct annealing. The coefficient of static friction μG of antifouling condition B-2 on the glass sample was 0.081.

2.5 Antifouling Condition B-3

In the same manner as described above, KY-178 (antifouling agent B) made by Shin-Etsu Chemical Co., Ltd. was employed as the antifouling agent and an antifouling layer 10 was formed. However, the solid component of the vapor deposition source was made 25 mg. When the vapor deposition had ended, the interior of the chamber was gradually returned to atmospheric pressure. The glass sample was removed, placed in a constant-temperature, constant-humidity chamber set to 60° C. and RH 60%, and kept there for two hours to conduct annealing. The coefficient of static friction μG of antifouling condition B-3 on the glass sample was 0.093.

2.6 Antifouling Condition B-4

In the same manner as described above, KY-178 (antifouling agent B) made by Shin-Etsu Chemical Co., Ltd. was employed as the antifouling agent and an antifouling layer 10 was formed. However, the solid component of the vapor deposition source was made 20 mg. When the vapor deposition had ended, the interior of the chamber was gradually returned to atmospheric pressure. The glass sample was removed, placed in a constant-temperature, constant-humidity chamber set to 60° C. and RH 60%, and kept there for two hours to conduct annealing. The coefficient of static friction μG of antifouling condition B-4 on the glass sample was 0.107. In some instances, antifouling conditions B-1 to B-4 will be referred to collectively as "antifouling condition B" below.

2.7 Antifouling Condition C

KY-130 (antifouling agent C) made by Shin-Etsu Chemical Co., Ltd. was employed as the antifouling agent. The film forming method was identical to that in antifouling condition B and the vapor deposition period was 5 minutes. Annealing was conducted once vapor deposition had ended in the same manner as for antifouling condition B. The coefficient of static friction μG of antifouling condition C on the glass sample was 0.125.

Antifouling agent C was a fluorine-containing organic silicon compound denoted by general formula (13) below with a molecular weight ranging from 2,000 to 3,000 and a molecular diameter presumed to be 2 nm.

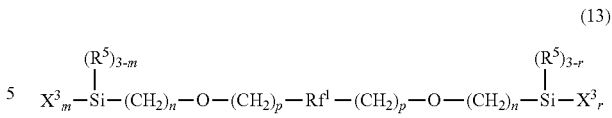

In general formula (13), $Rf^1$ denotes a divalent group with an unbranched, linear perfluoropolyalkylene ether structure containing a unit denoted by —$(C_kF_{2k})O$— (where k denotes an integer of 1 to 6). $R^5$ denotes a monovalent hydrocarbon group with 1 to 8 carbon atoms, $X^3$ denotes a hydrolyzable group or a hydrogen atom, p denotes 0, 1, or 2, n denotes an integer of 1 to 5, and each of m and r denotes 2 or 3.

2.8 Antifouling Condition D

KP-911 (antifouling agent D) made by Shin-Etsu Chemical Co., Ltd. was employed as the antifouling agent. The other condition was identical to those of antifouling condition B. The vapor deposition period was 5 minutes. Annealing was conducted once vapor deposition had ended in the same manner as for antifouling condition B. The coefficient of static friction μG of antifouling condition D on the glass sample was 0.378.

2.9 Antifouling Condition E

Optool DSX (antifouling agent E) made by Daikin Industries, Ltd. was employed as the antifouling agent. The other condition was identical to those of antifouling condition B. The vapor deposition period was 5 minutes. Annealing was conducted once vapor deposition had ended in the same manner as for antifouling condition B. The coefficient of static friction μG of antifouling condition E on the glass sample was 0.131.

Antifouling agent E was a fluorine-containing organic silicon compound denoted by general formula (14) below with a molecular weight ranging from 4,000 to 5,000 and a presumed molecular diameter of 2 nm.

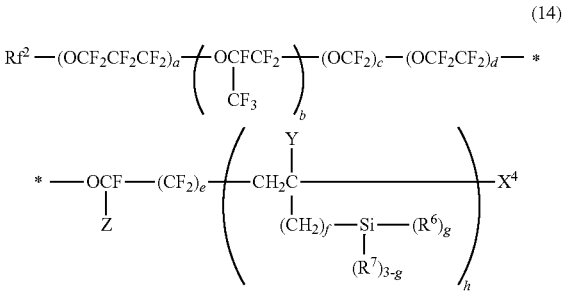

In general formula (14), $Rf^2$ denotes a perfluororalkyl group; $X^4$ denotes a hydrogen, bromine, or iodine atom; Y denotes a hydrogen atom or a lower alkyl group; Z denotes a fluorine atom or a trifluoromethyl group; $R^6$ denotes a hydroxyl group or a hydrolyzable group; and $R^7$ denotes a hydrogen atom or a monovalent hydrocarbon group. Each of a, b, c, d, and e denotes an integer of equal to or greater than 0, with a+b+c+d+e denoting an integer of equal to or greater than 1, and with the sequence of each repeating unit enclosed by a, b, c, d, and e not being limited in the formula. f denotes 0, 1, or 2. g denotes 1, 2, or 3. h denotes an integer of equal to or greater than 1.

3. Determining the Grime Wiping Property of Each of Antifouling Conditions a to E.

The grime wiping property of each of antifouling conditions A to E was determined. Specifically, the hard coat layer 4 and antireflective layer 5 described in "1. Manufacturing lens samples" were formed on the convex surface 2b of a lens substrate 2 with a spherical diopter power (S diopter power) of −3.00 D (diopters) and a cylindrical diopter power (C diopter power) of 0 D. Antifouling layers 10 of various antifouling conditions were formed on the surface of antireflective layer 5. Pseudo-fingerprints in the form of artificial sebum were transferred to the various convex surfaces. Each lens sample 1 was rotated at a prescribed speed while being repeatedly wiped with a cotton cloth and the number of sliding rotations required for the cotton cloth to wipe away the artificial sebum was tallied to determine the wiping property.

The composition of the artificial sebum employed was 20 wt % of cholesterol, 20 wt % of squalene, 20 wt % of palmitic acid, and 40 wt % of triolein. The pseudo-fingerprints were formed by diluting blended artificial sebum with a solvent such as methanol, applying the mixture uniformly to the surface of a glass substrate by the dipping method (where spin-coating method can be employed), and transferring it with a silicon plug. The end (12 mm in diameter) of the silicon plug used for the transfer was uniformly polished with #240 sandpaper and pressed with a load of 500 g against the glass surface upon which the artificial sebum had been applied. The end of the silicon plug to which the artificial sebum had adhered was then pressed with a load of 500 g against the center portion of the surface 19b of lens sample 1 to make the transfer.

Wiping of the lens sample was conducted at a constant rate (60 rotations per minute (rpm)) while contacting and sliding a cotton cloth at a constant rate (20 mm/s) at a load of 200 g. It was also possible to place the lens sample 1 on a scratch testing device and reproduce these conditions. The wiping property of the surfaces 19a and 19b of the antifouling layers 10a and 10b formed on concave surface 2a and convex surface 2b, respectively, was evaluated on a four-step scale based on the number of slides required for wiping:

◉: equal to or fewer than 50;
○: equal to or more than 51 and equal to or fewer than 70;
Δ: equal to or more than 71 and equal to or fewer than 90;
x: equal to or more than 91.

The above evaluation method can be applied to both the convex and concave surfaces of the lens. When employing a scratch testing device, it was possible to conduct more precise evaluation on the convex surface because of the jig mounting condition and the fit of the cotton cloth. Thus, in a present round, the convex surface was evaluated. The wiping property of antifouling conditions A-1, A-2, B-1, B-2, and B-3 was evaluated as ◉, the wiping property of antifouling conditions B-4, C, and E was evaluated as ○, and the wiping property of antifouling conditions D was evaluated as x. (In the various examples of FIG. 3, these results refer to the wiping property evaluation of both the concave surface and the convex surface.)

4. Determining the Incidence of Axial Displacement During Edging Process

The incidence of axial displacement during edging process was determined for each of antifouling conditions A to E. Specifically, various layers were formed as described in "1. Lens sample manufacturing" and "2. Antifouling conditions" on a lens substrate 2 with a spherical diopter power (S diopter power) of −8.50 D (diopters) and a cylindrical diopter power (C diopter power) of −0.50 D to obtain a lens sample 1. FIG. 3 shows the combinations of the antifouling conditions on the concave surface 2a and convex surface 2b of each lens sample 1. As indicated in FIG. 2, axial displacement-preventing tape 21 was applied to the surface 19b of the antifouling layer 10b formed based on the various antifouling conditions. Further, double-adhesive tape 22 was applied on the axial displacement-preventing tape 21 and secured with a convex surface-use chuck (leap cup) 23. Surface 19a was secured with a chuck 24 and edging process was conducted with a grindstone 25. For each type of lens sample 1 (Examples and Comparative Examples), the ratio of instances in which the axial displacement exceeded a permitted range was calculated for 10 lenses. When axial displacement occurred, the average value of the axial displacement angle was also calculated.

EP-100 made by Sun A. Kaken Co. was employed as axial displacement-preventing tape 21. LEAP3 made by Sumitomo 3M Corp. was employed as the double-adhesive tape. An SE-9090 made by Nidek Co., Ltd. was employed as the edge processor. The permitted range of axial displacement was equal to or less than ±1 degree.

FIG. 3 shows the results of evaluation of the axial displacement incidence. The axial displacement incidence for the convex surface antifouling condition was 70% in the case of antifouling condition A, 80% in the case of antifouling condition B-2, 20% in the case of antifouling condition B-3, and 0% in the case of antifouling conditions C, D, and E.

In the case where no axial displacement-preventing tape 21 was employed (not shown in the figure), the axial displacement incidence for antifouling condition D was 0%, but 100% for antifouling conditions B-4, C, and E. Accordingly, axial displacement-preventing tape 21 was found to be necessary for edging process with antifouling conditions B-4, C, and E.

5. Evaluation of Lens Samples

FIG. 3 shows the results of the evaluation of the wiping property and axial displacement incidence of concave surface 19a and convex surface 19b for 12 combinations of concave surface antifouling layer 10a and convex antifouling layer 10b formed based on the differing antifouling condition among antifouling conditions A to E.

Those combinations for which the wiping property of eyeball side concave surface 2a was extremely good (◉), the wiping property of convex surface 2b was good (○ or better), and the axial displacement incidence was 0% are listed as Examples 1 to 6. The other combinations are listed as Comparative Examples 1 to 6. FIG. 4 gives an overall evaluation distribution, with the coefficient of static friction μG1 of antifouling conditions corresponding to antifouling layer 10a formed on the concave surface 2a side on the glass sample plotted on the X axis and with the coefficient of static friction μG2 of antifouling conditions corresponding to antifouling layer 10b formed on the convex surface 2b side on the glass sample plotted on the Y axis.

When coefficient of static friction μG1 was equal to or less than 0.1, the wiping property of grime including sebum was extremely good. Eyeball side surface 19a tends to be fouled by sebum and sweat from the wearer, so it is desirable for grime not to readily adhere to the eyeball side surface 19a rather than to the convex surface. Thus, it was found that antifouling performance suited to eyeball side surface 19a could be achieved using an antifouling layer 10 with a μG1 of equal to or less than 0.1. Accordingly, the condition (antifouling condition) of antifouling layer 10a on the concave surface 2a side was desirably such that the antifouling condition (first antifouling condition) achieved a coefficient of static friction μG1 of equal to or less than 0.1. In the examples set forth above, the first antifouling conditions included antifouling conditions A-1, A-2, and B-1 to B-3.

However, when μG1 was equal to or less than 0.1, axial displacement tended to occur. To inhibit axial displacement, instead of forming an antifouling layer of the same condition as the eyeball side (concave surface 2a) on the object side (convex surface 2b), it was found to be desirable to form antifouling layers based on differing condition such that the coefficient of static friction μG2 of the surface of the convex surface 2b side (the surface 19b of the second antifouling layer 10b) was higher than coefficient of static friction μG1 of the surface of the concave 2a side (surface 19a of first antifouling layer 10b).

To adequately inhibit the axial displacement incidence, it was desirable for coefficient of static friction μG2 of the antifouling conditions on the convex surface 2b side (second antifouling conditions) to be equal to or higher than 0.1. When the wiping property of grime on the convex surface 2b side was taken into account, coefficient of static friction μG2 of the second antifouling conditions on the convex surface 2b side was found to desirably be equal to or less than 0.3. In the above examples, the second antifouling conditions include antifouling conditions B-4, C, and E. However, the upper limit of the coefficient of static friction μG2 of the second antifouling conditions can be suitably determined based on the grime wiping property required of the optical article. For example, it is possible to employ antifouling conditions such that coefficient of static friction μG2 exceeded 0.3 to reliably inhibit axis displacement.

Based on the above results, it was found desirable for coefficient of static friction μG1 of the first antifouling conditions on the concave surface 2a side and coefficient of static friction μG2 of the second antifouling conditions on the convex surface 2b side to satisfy the following conditions in order to form a lens affording good wiping performance on the concave surface 2a side and undergoing little axial displacement during processing:

$$\mu G1 < \mu G2 \tag{0}$$

$$0.01 \leq \mu G1 \leq 0.1 \tag{1}$$

$$0.1 \leq \mu G2 \leq 0.3 \tag{2}.$$

6. Coefficient of Static Friction of Lens Surfaces

The antifouling conditions above were evaluated based on the coefficient of static friction as measured on the surface of sheet-like glass samples. This was preconditioned on the measurement of surface friction with one of the normally available tribometers, as well as being preconditioned on the measurement of the coefficient of static friction of a flat surface in accordance with (JIS K7125) relating to the measurement of coefficients of static friction.

Accordingly, by way of precaution, the same tribometer was employed to measure the coefficient of static friction of an eyeglass lens having curvature. FIG. 5 gives the typical results of measurement for a lens. Lens samples 1 were prepared having the same lens substrates 2 as those set forth above but with two different curvatures, and the coefficient of static friction of the concave surface 2a side and convex surface 2b side were measured. The conditions of hard coat layer 4 and antireflective layer 5 were as set forth above. Antifouling layers 10a and 10b were formed with antifouling condition C on concave surface 2a and convex surface 2b. The vapor deposition time was five minutes and annealing was conducted once vapor deposition had ended in the same manner as for antifouling conditions C above. The coefficient of static friction μG of the antifouling condition employed (antifouling condition C-1) on the glass sample was 0.110.

Three points were selected on each of concave surface 2a and convex surface 2b and coefficient of static friction measurement was conducted such that the center portion of the measurement terminal of the tribometer came into contact at the center of the three points. In the course of conducting measurement, every effort was made to keep the tribometer horizontal. The coefficient of static friction was measured three times at each point and the measurements were averaged. With the exception of the above, measurement of the coefficient of static friction was conducted in the same manner as on the glass samples set forth above.

When the coefficient of static friction of the eyeglass lenses of differing curvature was measured by the measurement method set forth above, it was found that when the radius of curvature on the concave surface 2a side was equal to or greater than 350 mm, the measurement of the coefficient of static friction was nearly identical to that of a flat surface, and when the radius of curvature on the convex surface 2b side was equal to or greater than 120 mm, the measurement of the coefficient of static friction was nearly identical to that of a flat surface. Eyeglass lenses prepared with the above radii of curvature are, for example, plastic lenses with refractive indexes of about 1.67, typically SUPER SOVEREIGN made by Seiko Optical articles Co., Ltd, with S diopter powers of equal to or higher than 2.25 D. By way of example, the radius of curvature on the concave surface 2a side can be equal to or less than 5000 mm, and the radius of curvature on the convex surface 2b side can be equal to or less than 15000 mm.

Within the above-stated radius of curvature range, the coefficient of static friction μL of the surface of the lens, independently of the radius of curvature, was found to increase by about 20% on the concave 2a side and to decrease by about 5% on the convex 2b side, relative to the values measured on the glass sample. Accordingly, it is possible to measure the coefficient of static friction μL of the surface of even lenses of relatively large radii of curvature. From that value, it is possible to estimate the coefficient of static friction μG on the glass sample used to define the antifouling conditions.

Accordingly, when evaluating the first antifouling condition of the concave surface 2a side and the second antifouling condition of the convex surface 2b side with the coefficient of static friction μL of the lens surface, it is desirable for the coefficient of static friction μL1, relative to cotton cloth, of the surface 19a of the first antifouling layer 10a formed based on the first antifouling condition, either directly or through at least one additional layer on the concave surface with a radius of curvature of at least 350 mm, to satisfy the conditions set forth below, and it is desirable for the second antifouling condition to be such that the coefficient of static friction μL2, relative to cotton cloth, of the surface 19b of the second antifouling layer 10b based on the second antifouling condition, formed either directly or through at least one additional layer on a convex surface 2b with a radius of curvature of at least 120 mm, to satisfy the following conditions. In this context, the values that are given have been rounded off to the third decimal place. The upper limit of the coefficient of static friction μL1 can be suitably determined in the same manner as for coefficient of static friction μG1. In coefficient of static friction μL1 and coefficient of static friction μL2, the amount of change in the value relative to the coefficient of static friction on a glass sample varied. Thus, coefficient of static friction μL2 would sometimes be smaller than coefficient of static friction μL1. In such cases, as well, it is possible to achieve an inhibitory effect on axial displacement within the range of conditions (3) and (4) below.

$$0.01 \leq \mu L1 \leq 0.12 \quad (3)$$

$$0.1 \leq \mu L2 \leq 0.3 \quad (4)$$

$$\mu L1 < \mu L2 \quad (5).$$

As set forth above, in an optical article having a concave surface 2a on the eyeball side and a convex surface 2b on the object side, such as an eyeglass lens or a sunglass lens, it is possible to provide an optical article affording good sliding property and antifouling performance on the concave surface side, and that can be edge processed without problems, by varying the conditions of the antifouling layers formed on the surfaces and not making them identical. It is possible to specify the condition of the antifouling layer of the concave surface side and the condition of the antifouling layer of the convex surface layer side to as to achieve the coefficients of static friction set forth above, making it possible to manufacture and provide an optical article such as an eyeglass lens that affords high antifouling performance and that can be processed into a given shape.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. An optical article, which comprises:
   an optical substrate comprising a concave surface with a radius of curvature of equal to or greater than 350 mm on one side and a convex surface with a radius of curvature of equal to or greater than 120 mm on the other side;
   a first antifouling layer directly or through at least one additional layer on the concave surface; and
   a second antifouling layer directly or through at least one additional layer on the convex surface;
   and satisfies the conditions below:

$$0.01 \leq \mu L1 \leq 0.12$$

$$0.1 \leq \mu L2$$

$$\mu L1 < \mu L2$$

wherein $\mu L1$ denotes a coefficient of static friction of a surface of the first antifouling layer, and $\mu L2$ denotes a coefficient of static friction of a surface of the second antifouling layer.

2. An optical article, which comprises:
   an optical substrate comprising a concave surface on one side and a convex surface on the other side;
   a first antifouling layer directly or through at least one additional layer on the concave surface; and
   a second antifouling layer directly or through at least one additional layer on the convex surface;
   and satisfies the conditions below:

$$0.01 \leq \mu G1 \leq 0.1$$

$$0.1 \leq \mu G2$$

$$\mu G1 < \mu G2$$

wherein $\mu G1$ denotes a coefficient of static friction of a surface of the first antifouling layer when formed directly or through at least one additional layer on a flat glass substrate, and $\mu G2$ denotes a coefficient of static friction of a surface of the second antifouling layer when formed directly or through at least one additional layer on a flat glass substrate.

3. The optical article according to claim 1, which is an eyeglass lens.

4. The optical article according to claim 3, wherein the first antifouling layer is an outermost layer on an eyeball side of the eyeglass lens.

5. The optical article according to claim 1, wherein each of the first antifouling layer and the second antifouling layer is an outermost layer of the optical article.

6. The optical article according to claim 1, wherein the first antifouling layer and the second antifouling layer comprises an antifouling agent in the form of an organic compound.

7. The optical article according to claim 6, wherein the organic compound is a fluorine-containing organic compound.

8. The optical article according to claim 2, which is an eyeglass lens.

9. The optical article according to claim 8, wherein the first antifouling layer is an outermost layer of the eyeglass lens.

10. The optical article according to claim 2, wherein each of the first antifouling layer and the second antifouling layer is an outermost layer of the optical article.

11. The optical article according to claim 2, wherein the first antifouling layer and the second antifouling layer comprises an antifouling agent in the form of an organic compound.

12. The optical article according to claim 11, wherein the organic compound is a fluorine-containing organic compound.

* * * * *